(12) United States Patent
Chuang et al.

(10) Patent No.: US 8,028,177 B2
(45) Date of Patent: Sep. 27, 2011

(54) METHOD FOR CHANGING POWER STATES OF A COMPUTER

(75) Inventors: Wen-Cheng Chuang, Taipei Hsien (TW); Ching-Jou Chen, Taipei Hsien (TW); Hung-Chi Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 431 days.

(21) Appl. No.: 12/344,251

(22) Filed: Dec. 25, 2008

(65) Prior Publication Data
US 2009/0217026 A1 Aug. 27, 2009

(30) Foreign Application Priority Data
Feb. 21, 2008 (CN) .......................... 2008 1 0300368

(51) Int. Cl.
*G06F 1/26* (2006.01)
*G06F 1/32* (2006.01)
*G06F 15/177* (2006.01)
*G06F 9/24* (2006.01)

(52) U.S. Cl. ........ 713/300; 713/310; 713/320; 713/321; 713/322; 713/323; 713/324; 713/330; 713/340; 713/1; 713/2; 713/100; 711/100

(58) Field of Classification Search .................. 713/300, 713/310, 320–324, 330, 340, 1, 2, 100; 711/100
See application file for complete search history.

(56) References Cited

U.S. PATENT DOCUMENTS

| 6,438,668 B1 * | 8/2002 | Esfahani et al. ............. 711/165 |
| 6,691,234 B1 * | 2/2004 | Huff .............................. 713/300 |
| 6,901,298 B1 * | 5/2005 | Govindaraj et al. ............ 700/21 |
| 7,757,060 B2 * | 7/2010 | Montero et al. ............. 711/165 |
| 2008/0082752 A1 * | 4/2008 | Chary et al. .................. 711/118 |

FOREIGN PATENT DOCUMENTS

| CN | 1530796 A | 9/2004 |
| CN | 1818869 A | 8/2006 |
| CN | 1818870 A | 8/2006 |

* cited by examiner

*Primary Examiner* — Chun Cao
*Assistant Examiner* — Fahmida Rahman
(74) *Attorney, Agent, or Firm* — Altis Law Group, Inc.

(57) ABSTRACT

A method for changing power states of a computer sends a shutdown event to all running applications before the computer goes to sleep to prevent data loss in a sleep state of the computer. Furthermore, the method stores a system memory image into a flash memory before the computer goes to the sleep state. Moreover, the method restores the system memory image from the flash memory to the system memory when the computer exit the sleep state to come back the work state.

11 Claims, 4 Drawing Sheets

METHOD FOR CHANGING POWER STATES OF A COMPUTER

BACKGROUND

1. Field of the Invention

Embodiments of the present disclosure are related to methods of computer management, and particularly to a method for changing power states of a computer.

2. Description of Related Art

Computers may have a total of six different power states ranging from S0 to S5. In state S0, the computer is completely powered on and fully operational, while in state S5, the computer is completely powered off. The states S1, S2, S3 and S4 are referred to as sleep states, in which the computer appears off in order to conserve power. The computer in any sleep state retains enough of the hardware context, thus can return to the work state S0 without a system reboot. If the computer in state S1, S2, or S3 loses battery power, it will lose all the hardware context, therefore, the computer must reboot to return to state S0. The computer in state S4 can restart from its previous location even after it loses battery power, because operating system context is retained in a memory image, which was written to a disk by the computer before entering state S4.

However, if enabled applications have not been stored before the computer goes to state S4 from S0, and the boot device (e.g. a hard disk) of the computer is changed before the computer loses battery power, the computer cannot return to state S0 when resuming battery power because of the boot device has been changed, thus, the applications cannot be restored. In addition, because reading the memory image from the disk spends much time, restarting the computer from state S4 to S0 has a long wake-up latency.

What is needed, therefore, is a method for changing power states of a computer, which can change the power states of the computer between state S0 and S4 with high efficiency.

DETAILED DESCRIPTION OF CERTAIN INVENTIVE EMBODIMENTS

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
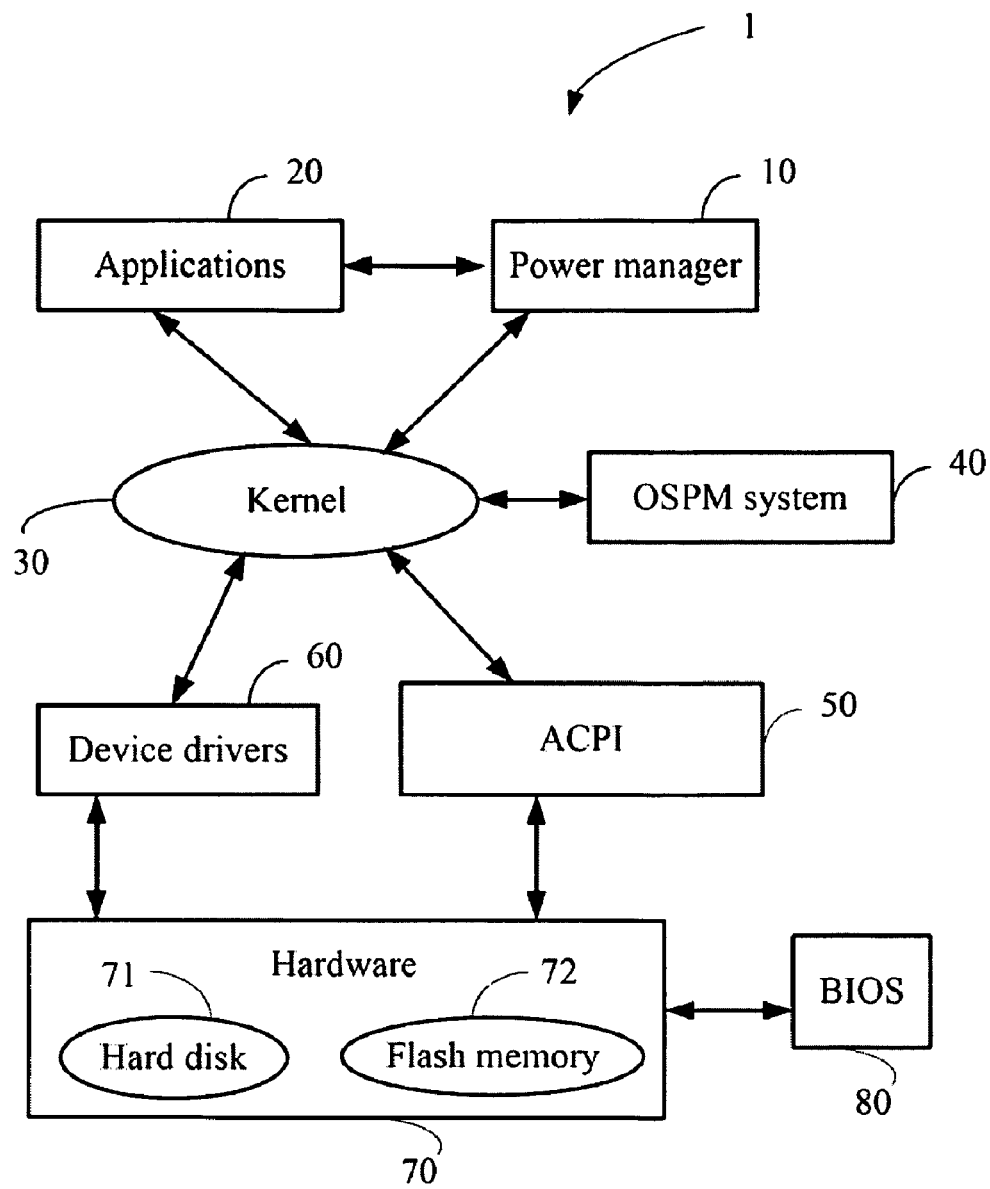
FIG. 1 is a block diagram of one embodiment illustrating a structure of a computer in which a method for changing power states of the computer is implemented.

FIG. 1 is a block diagram of one embodiment illustrating a structure of a computer 1 in which a method for changing power states of the computer 1 is implemented. In one embodiment, an operating system (OS) of the computer 1 is modular and consists of two main layers, a user mode and a kernel mode. For example, components such as a power manager 10 and a plurality of applications 20 run in the user mode. Components such as a kernel 30, an operating system-directed power management (OSPM) 40, an advanced configuration and power management interface (ACPI) 50, and multiple device drivers 60 run in the kernel mode. The components running in the user mode communicates with the components running in the kernel mode via the kernel 30. The components in the kernel mode have unrestricted access to hardware 70 of the computer 1, for example, system memory and external devices such as a hard disk 71 and a flash memory 72 shown in FIG. 1. A basic input/output system (BIOS) 80 is also included to identify and initialize the hardware 70 when the computer 1 is powered on.

Figure 2A:
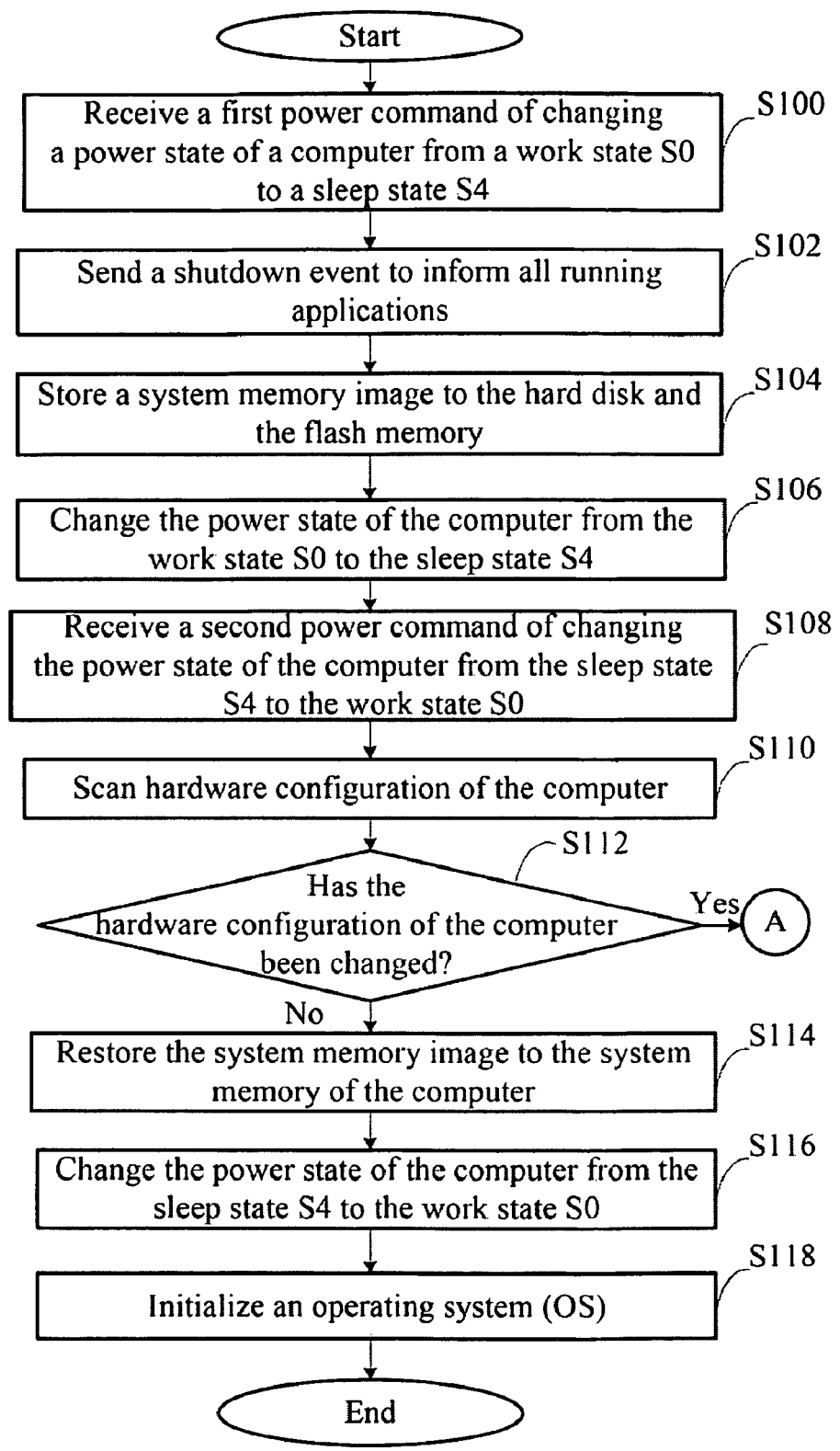
FIG. 2 including FIG. 2A
FIG. 2B is a flowchart of one embodiment of the method for changing power states of the computer in FIG. 1.
Figure 2B:
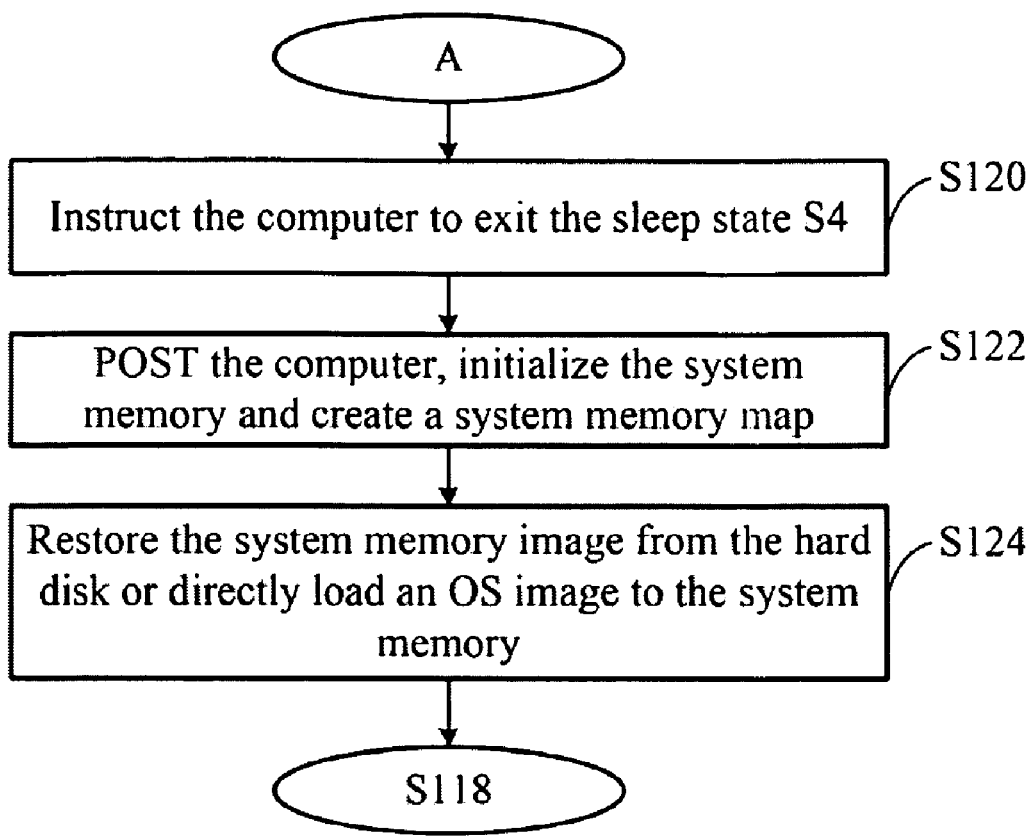

FIG. 2 including FIG. 2A and FIG. 2B is a flowchart of one embodiment of the method for changing power states of the computer 1 in FIG. 1. Additional blocks may be added or deleted and blocks may be executed in a different order than that described without deviating from the spirit of the disclosure. At first, in block S100, the computer 1 in state S0 receives a first power command to change a power state of the computer from a work state S0 to a sleep state S4.

In block S102, the power manager 10 sends a shutdown event to all running applications 20, and displays a message prompting a user to save any user data that might be lost when the computer is in the S4 state.

In block S104, the BIOS 80 stores a pre-power-down memory state of the computer 1 by creating an image of system memory (hereinafter, "the system memory image") of the computer 1 in the flash memory 72, and the OSPM 40 stores the system memory image into the hard disk 71 via the kernel 30 and the ACPI 50. The system memory is an area where the computer 1 temporary holds running programs and data that are in use. In one embodiment, the system memory may be a read only memory (ROM), a random access memory (RAM), a cache memory, or any other suitable memory. The system memory image is a copy of programs and data that are in use.

In block S106, the OSPM 40 changes the power state of the computer 1 from the work state S0 to the sleep state S4 by executing a series of going-to-sleep instructions. The going-to-sleep instructions comprise a transition to state (TTS) control method used to prepare the hardware 70 to sleep, and a prepare to sleep (PTS) control method to notify the device drivers 60 of the sleep state transition. The computer 1 consumes the least power when in the sleep state S4 compared to all other sleep states.

In block S108, the computer 1 receives a second power command to change the power state of the computer from the sleep state S4 to the work state S0.

In block S110, the BIOS 80 scans hardware configuration of the computer 1. For example, the BIOS 80 identifies a central process unit (CPU), the system memory, external devices such as the hard disk 71 and the flash memory 72, etc.

In block S112, the BIOS 80 detects if the hardware configuration of the computer 1 has been changed in the sleep state S4. For example, the BIOS 80 detects if the flash memory 72 exists. If the hardware configuration has not been changed, the procedure goes to block S114. Otherwise, if the hardware configuration has been changed, the procedure goes to block 120.

In block S114, the BIOS 80 restores the system memory image from the flash memory 72 to the system memory.

In block S116, the OSPM 40 changes the power state of the computer 1 from the sleep state S4 to the work state S0 by executing a series of wake-up instructions. The wake-up instructions comprise a back from sleep (BFS) control method allowing the ACPI 50 to perform any required functions when returning from the sleep state S4.

In block S118, the computer 1 initializes the operating system of the computer 1.

In block S120, the BIOS 80 instructs the computer 1 to exit the sleep state S4. In one embodiment, the BIOS 80 set a value of a sleep enable field SLP_EN in a ACPI register to '0' to signal the computer 1 to exit the sleep state S4.

In block S122, the BIOS 80 performs a power-on-self-test (POST) of the computer 1, initializes the system memory, and creates a system memory map. The system memory map shows how addresses of the system memory have been allocated to the components of the computer 1, e.g., the applications 20, the ACPI 50, the system memory image, and so on.

In block S124, the OSPM 40 restores the system memory image from the hard disk 71 or directly loads an OS image from the hard disk 71 to the system memory. The OS image is a file that contains the OS. A detailed description of block S124 is given in FIG. 3 below.

Figure 3:
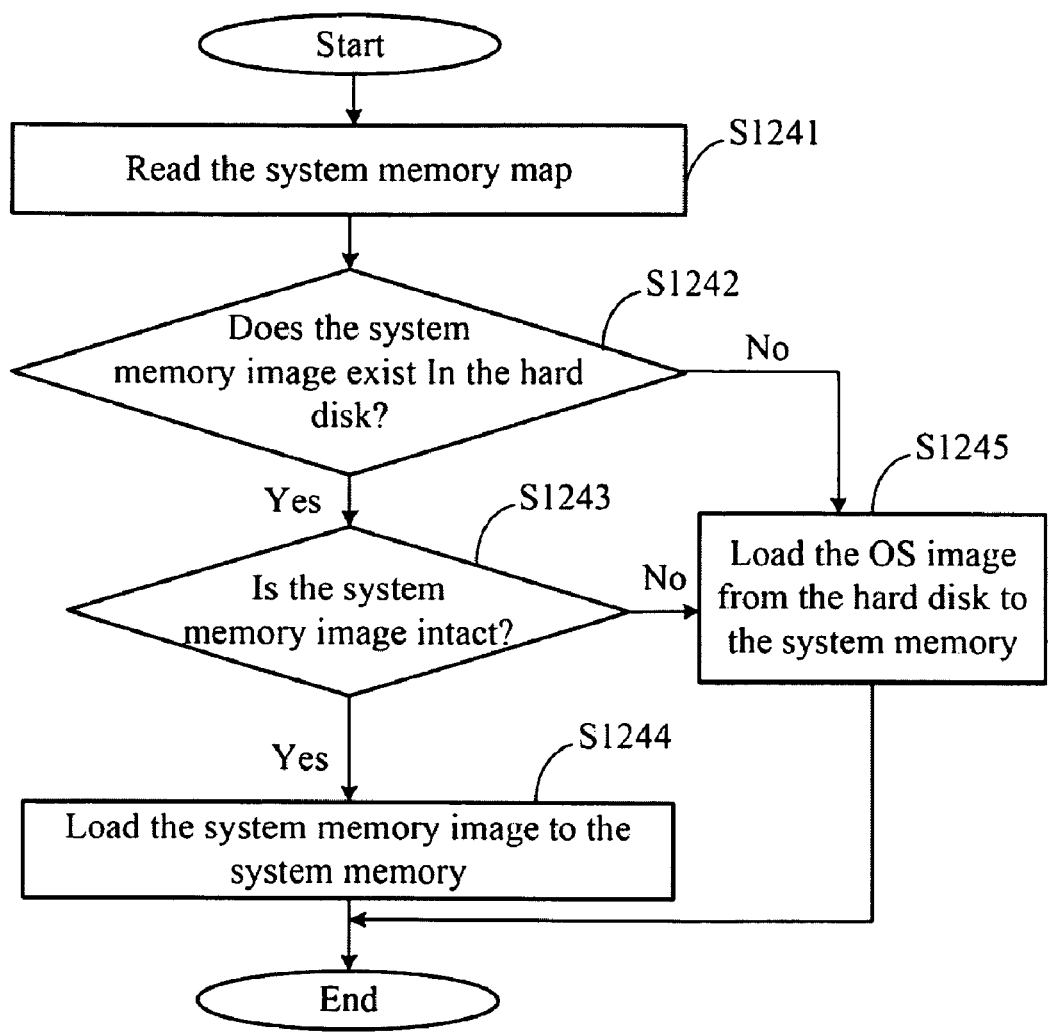
FIG. 3 is a detailed description of one block in FIG. 2B.

FIG. 3 is the detailed description of block S124 in FIG. 2B. In block S1241, the OSPM 40 reads the system memory map. In block S1242, the OSPM 40 checks if the hard disk 71 stores the system memory image. If the hard disk 71 stores the system memory image, the procedure goes to block S1243. Otherwise, if the hard disk 71 does not store the system memory image, the procedure goes to block S1245.

In block S1243, the OSPM 40 checks if the system memory image is intact. In one embodiment, the OSPM 40 checks if the system memory image is intact by computing a current checksum of the system memory image, and compare the current checksum with a pre-stored checksum of the system memory image. If the system memory image is intact, the procedure goes to block S1244. Otherwise, if the system memory image is not intact, for example, the system memory image has been damaged, the procedure goes to block S1245.

In block S1244, the OSPM 40 loads the system memory image from the hard disk 71 to the system memory according to the system memory map.

In block S1245, the OSPM 40 loads the OS image from the hard disk 71 to the system memory.

The present embodiment uses the power manager 10 to send the shutdown event to all running applications 20 before the computer 1 goes to the sleep state S4, thus, data lost in the sleep state S4 can be prevented. Furthermore, the present embodiment uses the BIOS 80 stores the system memory image into the flash memory 72 before the computer 1 enters the sleep state S4. Because reading and writing data to the flash memory 72 is much faster than reading and writing data to the hard disk 71, the computer can enter and exit the work state S0 and the sleep state S4 with less time.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A method for changing power states of a computer, comprising:
    receiving a first power command to change a power state of the computer from a work state to a sleep state;
    sending a shutdown event to all running applications of the computer;
    storing a system memory image of the computer into a flash memory of the computer, and storing the system memory image into a hard disk of the computer;
    changing the state of the computer from the work state to the sleep state by executing a series of going-to-sleep instructions;
    receiving a second power command to change the power state of the computer from the sleep state to the work state;
    identifying hardware configuration of the computer and checking if the hardware configuration of the computer has been changed in the sleep state; and
    restoring the system memory image from the hard disk or directly loading an operating system image from the hard disk if the hardware configuration of the computer has been changed, comprising:
        instructing the computer to exit the sleep state;
        initializing the system memory and creating a system memory map;
        checking if the system memory image exists in the hard disk; and
        loading the system memory image from the hard disk according to the system memory map, in response to a determination that the system memory image exists in the hard disk and is intact; or
        loading the operating system image from the hard disk, in response to a determination that the system memory image does not exist in the hard disk or the system memory image is not intact.

2. The method as claimed in claim 1, wherein the system memory is selected from the group consisting of a read only memory (ROM), a random access memory (RAM), and a cache memory.

3. The method as claimed in claim 1, wherein the system memory image is a copy of running programs and data that are in use of the computer.

4. The method as claimed in claim 1, wherein the system memory image is determined as intact upon the condition that a current checksum of the system memory image equals a pre-stored checksum of the system memory image, and is determined as not intact upon the condition that the current checksum of the system memory image does not equal the pre-stored checksum of the system memory image.

5. The method as claimed in claim 1, wherein instructing the computer to exit the sleep state comprises setting a value of a sleep enable field SLP_EN in a ACPI register to zero.

6. A non-transitory computer-readable medium having stored thereon instructions that, when executed by a computer, causing the computer to perform a method for changing power states of a computer, the method comprising:
    receiving a first power command to change a power state of the computer from a work state to a sleep state;
    sending a shutdown event to all running applications;
    storing a system memory image of the computer into a flash memory of the computer, and storing the system memory image into a hard disk of the computer;
    changing the power state of the computer from the work state to the sleep state by executing a series of going-to-sleep instructions;
    receiving a second power command to change the power state of the computer from the sleep state to the work state;
    identifying hardware configuration of the computer and checking if the hardware configuration of the computer has been changed in the sleep state; and
    restoring the system memory image from the hard disk or directly loading an operating system image from the hard disk if the hardware configuration of the computer has been changed, comprising:
        instructing the computer to exit the sleep state;

initializing the system memory and creating a system memory map;

checking if the system memory image exists in the hard disk; and loading the system memory image from the hard disk according to the system memory map, in response to a determination that the system memory image exists in the hard disk and is intact; or loading the operating system image from the hard disk, in response to a determination that the system memory image does not exist in the hard disk or the system memory image is not intact.

7. The non-transitory computer-readable medium as claimed in claim 6, wherein the system memory is selected from the group consisting of a read only memory (ROM), a random access memory (RAM), and a cache memory.

8. The non-transitory computer-readable medium as claimed in claim 6, wherein the system memory image is a copy of running programs and data that are in use of the computer.

9. The non-transitory computer-readable medium as claimed in claim 6, wherein the system memory image is determined as intact upon the condition that a current checksum of the system memory image equals a pre-stored checksum of the system memory image, and is determined as not intact upon the condition that the current checksum of the system memory image does not equal the pre-stored checksum of the system memory image.

10. The non-transitory computer-readable medium as claimed in claim 6, wherein instructing the computer to exit the sleep state comprises setting a value of a sleep enable field SLP_EN in a ACPI register to zero.

11. A method for changing power states of a computer, comprising:

receiving a first power command to change a power state of the computer from a work state to a sleep state;

sending a shutdown event to all running applications of the computer;

storing a system memory image of the computer into a flash memory of the computer, and storing the system memory image into a hard disk of the computer;

changing the state of the computer from the work state to the sleep state by executing a series of going-to-sleep instructions;

receiving a second power command to change the power state of the computer from the sleep state to the work state;

identifying hardware configuration of the computer and checking if the hardware configuration of the computer has been changed in the sleep state;

restoring the system memory image from the flash memory, and changing the state of the computer from the sleep state to the work state if the hardware configuration has not been changed; and restoring the system memory image from the hard disk or directly loading an operating system image from the hard disk if the hardware configuration of the computer has been changed, comprising:

instructing the computer to exit the sleep state;

initializing the system memory and creating a system memory map;

checking if the system memory image exists in the hard disk; and loading the system memory image from the hard disk according to the system memory map, in response to a determination that the system memory image exists in the hard disk and is intact; or loading the operating system image from the hard disk, in response to a determination that the system memory image does not exist in the hard disk or the system memory image is not intact.

* * * * *